UNITED STATES PATENT OFFICE.

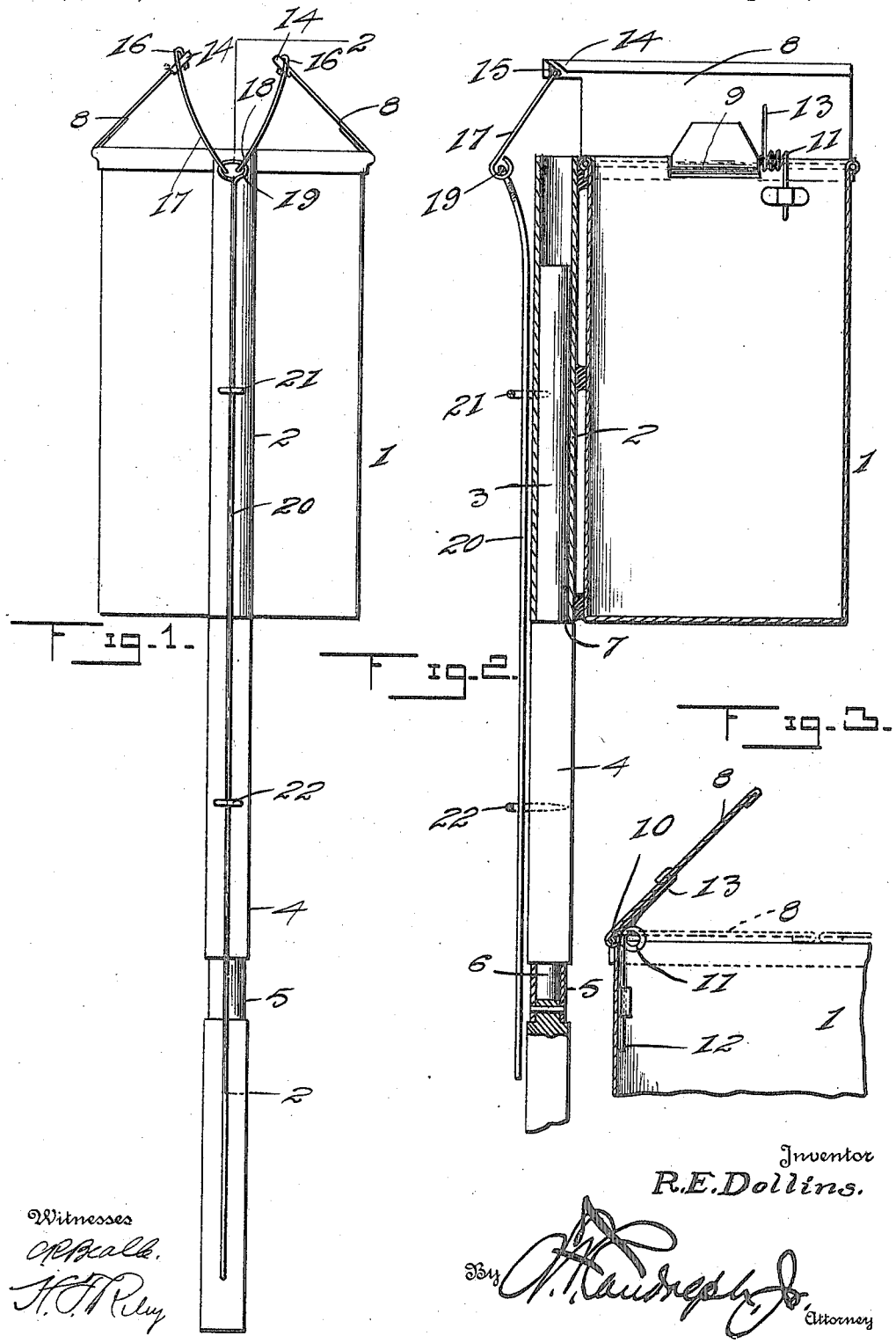

ROBERT EARAL DOLLINS, OF MARION, KENTUCKY, ASSIGNOR OF ONE-HALF TO WILLIAM J. DE BOE, OF MARION, KENTUCKY.

FRUIT-GATHERER.

1,180,111.  Specification of Letters Patent.  Patented Apr. 18, 1916.

Application filed August 10, 1915. Serial No. 44,766.

*To all whom it may concern:*

Be it known that I, ROBERT E. DOLLINS, a citizen of the United States, residing at Marion, in the county of Crittenden and State of Kentucky, have invented certain new and useful Improvements in Fruit-Gatherers; and I do hereby declare the following to be a full, clear, and exact description of the invention, such as will enable others skilled in the art to which it appertains to make and use the same.

The invention relates to improvements in fruit gatherers.

The object of the present invention is to improve the construction of fruit gatherers and to provide a simple, practical and inexpensive fruit gatherer of strong and durable construction capable of enabling various kinds of fruit to be rapidly picked from a tree without bruising or otherwise injuring the fruit and adapted to be readily varied in length to suit the height of the tree being picked and capable also of being compactly stored in a comparatively small space when not in use.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawing Figure 1 is an elevation of a fruit picker or gatherer constructed in accordance with this invention, Fig. 2 is a vertical sectional view of the same, Fig. 3 is a detail sectional view through the upper portion of the receptacle taken at right angles to Fig. 2.

Like numerals of reference designate corresponding parts in all the figures of the drawing.

In the acompanying drawing in which is illustrated the preferred embodiment of the invention, 1 designates a rectangular receptacle designed to be constructed of galvanized metal or other suitable material and composed of vertical walls and a bottom and provided at the back with a vertical tube 2 forming a socket for an upper reduced portion 3 of a handle 4. The receptacle is preferably rectangular in horizontal section and the handle 4 is composed of sections detachably connected together by joints composed of a socket 5 and a reduced terminal portion 6. The socket preferably consists of tubing as clearly illustrated in Fig. 2 of the drawing and any number of the sections of the handle may be employed to enable a handle of the desired length to be provided for the fruit gatherer. Also the sections are adapted to be disconnected to shorten the handle and to enable the fruit gatherer to be stored in a comparatively small space. The reduced upper portion 3 of the handle forms a shoulder 7 which fits against the lower end of the tubular socket.

The receptacle is provided at opposite sides of its top with hinged lids 8 adapted when closed to meet at the center and capable of gripping or severing the stem of a fruit whereby the latter may be readily picked without bruising or otherwise injuring it. The lids are provided at their outer side edges with central eyes or hinged elements 9 to receive pintle wires 10 carried by the receptacle and preferably arranged in a bead thereof. These lids are normally supported in a partially open inclined position as illustrated in Figs. 1 and 3 by coiled springs 11 having terminal portions 12 and 13 suitably secured to the inner faces of the adjacent side walls of the receptacle and the inner or lower faces of the hinged lids.

The hinged lids are provided at their free edges with rearwardly projecting portions 14 having perforations 15 into which are linked eyes 16 of short links or rods 17 which are also provided at their lower ends with eyes 18 to receive an enlarged eye 19 of an operating rod or member 20. The operating rod or member 20 which extends longitudinally of the handle operates in guides 21 and 22 carried by the socket and the handle and the said rod is adapted to be pulled upon to close the lids on a stem in picking the fruit.

As soon as the operating rod is released the springs will lift and open the lids for engaging another stem. The receptacle is of sufficient size to hold a considerable amount of fruit and it will enable the same to be rapidly transferred to a basket or other receptacle without injuring the fruit.

The device is adapted to pick various kinds of fruit and will enable the same to be readily removed from a tree without the use of ladders and without climbing the tree or injuring the same.

What is claimed is:—

A fruit gatherer comprising a substantially rectangular receptacle open at the top, lids hinged at their outer edges to opposite walls of the receptacle at the top thereof in position to swing inwardly to substantially a horizontal position with their free edges adjacent to each other, said lids being provided at one end with lateral extensions projecting beyond the adjacent wall of the receptacle, a pole secured to the receptacle at such wall, an operating rod movable along the pole, links connecting the operating rod with said lateral extensions of the lids and yieldable means for urging the lids to their open position.

In testimony whereof I affix my signature in presence of two witnesses.

ROBERT EARAL DOLLINS.

Witnesses:
C. G. THOMPSON,
W. L. DOLLINS.

Copies of this patent may be obtained for five cents each, by addressing the "Commissioner of Patents, Washington, D. C."